United States Patent
Kim et al.

(10) Patent No.: US 8,725,183 B2
(45) Date of Patent: May 13, 2014

(54) DEVICE AND METHOD FOR MANAGING BASE STATION AND TERMINAL

(75) Inventors: Won-Ik Kim, Daejeon (KR); Jae Sun Cha, Daejeon (KR); Sung Cheol Chang, Daejeon (KR); Kwang Jae Lim, Daejeon (KR); Hyun-Jae Kim, Incheon (KR); Sung Kyung Kim, Daejoen (KR); Chul Sik Yoon, Seoul (KR)

(73) Assignees: Samsung Electroncs Co., Ltd., Suwon-si (KR); Electronics and Telecommunications Research Institute, Daejeon (KR)

( * ) Notice: Subject to any disclaimer, the term of this patent is extended or adjusted under 35 U.S.C. 154(b) by 43 days.

(21) Appl. No.: 13/378,456

(22) PCT Filed: Jun. 17, 2010

(86) PCT No.: PCT/KR2010/003906
§ 371 (c)(1),
(2), (4) Date: Dec. 15, 2011

(87) PCT Pub. No.: WO2010/147400
PCT Pub. Date: Dec. 23, 2010

(65) Prior Publication Data
US 2012/0094654 A1    Apr. 19, 2012

(30) Foreign Application Priority Data

Jun. 18, 2009 (KR) .......... 10-2009-0054419
Jul. 30, 2009 (KR) .......... 10-2009-0070253
Aug. 4, 2009 (KR) .......... 10-2009-0071718
Jun. 4, 2010 (KR) .......... 10-2010-0053075

(51) Int. Cl.
*H04W 68/00* (2009.01)

(52) U.S. Cl.
USPC .......... 455/458; 455/561; 455/422.1

(58) Field of Classification Search
USPC .......... 455/458, 561, 422.1
See application file for complete search history.

(56) References Cited

U.S. PATENT DOCUMENTS

| 7,944,867 | B2 * | 5/2011 | Usuba .......... 370/311 |
| 2007/0066329 | A1 * | 3/2007 | Laroia et al. .......... 455/502 |
| 2009/0092081 | A1 | 4/2009 | Balasubramanian et al. |
| 2009/0092096 | A1 | 4/2009 | Czaja et al. |
| 2009/0135737 | A1 | 5/2009 | Vikberg et al. |
| 2009/0290561 | A1 | 11/2009 | Kleindl |
| 2010/0151852 | A1 | 6/2010 | Mori et al. |

(Continued)

FOREIGN PATENT DOCUMENTS

DE    10 2005 051291 A1    5/2007
EP    2 056 628 A1    5/2009

(Continued)

OTHER PUBLICATIONS

Baowei Ji; "The SON/Femto RG Harmonized Text"; Jan. 15, 1009.*

(Continued)

*Primary Examiner* — Khai M Nguyen
(74) *Attorney, Agent, or Firm* — Jefferson IP Law, LLP

(57) ABSTRACT

A base station management method according to the present invention is a method for managing an operation mode of a base station, and includes determining whether a terminal exists in a cell managed by the base station and operating in a low duty operation mode (LDM) when no terminal exists in the cell.

11 Claims, 6 Drawing Sheets

(56) References Cited

U.S. PATENT DOCUMENTS

| | | | |
|---|---|---|---|
| 2011/0003591 A1* | 1/2011 | Venkatachalam et al. | 455/434 |
| 2011/0085611 A1 | 4/2011 | Laroia et al. | |
| 2012/0028632 A1* | 2/2012 | Maeder et al. | 455/422.1 |

FOREIGN PATENT DOCUMENTS

| | | |
|---|---|---|
| EP | 2 452 516 A2 | 5/2012 |
| JP | 2008-160576 A | 7/2008 |
| JP | 2009-510835 A | 3/2009 |
| WO | 2007/149993 A2 | 12/2007 |
| WO | 2008/136416 A | 11/2008 |
| WO | 2010/124865 A | 11/2010 |

OTHER PUBLICATIONS

Shkumbin Hamiti, IEEE 802.16m System Description Document [Draft], IEEE 802.16 Broadband Wireless Access Working Group, May 31, 2005.

"The SON/Femto RG Harmonized Text; C802.16m-09/0377", IEEE Draft; C80216M-09_0377, IEEE-SA, Piscataway, NJ USA, vol. 802.16m, Jan. 15, 2009, pp. 1-9, XP017611556.

"IEEE 802.16m on Low Duty Cycle Mode of Femtocell Base Stations; C80216m-09_0821r1", IEEE Draft; C80216M-09_0821R1, IEEE-SA, Piscataway, NJ USA, vol. 802.16m, May 4, 2009, pp. 1-6, XP017617111.

\* cited by examiner

A DEVICE AND METHOD FOR MANAGING BASE STATION AND TERMINAL

TECHNICAL FIELD

The present invention relates to a management device of a base station, a management method thereof, and a terminal.

BACKGROUND ART

A femtocell is a region where a wireless communication service is provided to areas within, for example, a 30 m radius. A femto base station managing the femtocell is installed at an office or a home, and uses a frequency that is the same or different from other cells targeting a wider region than the femtocell.

Meanwhile, even when a terminal is not present in a region that the base station itself manages, the base station periodically broadcasts system data corresponding to the region that the base station itself manages against a time when the base station is connected to the terminal. Since the range of the femtocell is comparatively small, when the femto base station periodically broadcasts the system data, interference with another cell base station using the same frequency as the femto base station or another femto base station may be generated. Further, when the femto base station periodically broadcasts the system data, the femto base station consumes unnecessary power even when the terminal is not present.

Thus, when no terminal is connected to the femto base station and a connected terminal is in an idle mode or a sleep mode, the femto base station may be operated in a low duty mode (LDM). In this case, since an LDM pattern of the femto base station may be variously set depending on an operation state of the terminal, the terminal should transmit LDM pattern data of the femto base station whenever it is changed to a neighboring cell so as to scan the femto base station operated in the LDM.

DISCLOSURE

Technical Problem

The present invention has been made in an effort to reduce signal overhead of a communication system by setting an LDM pattern that can be constantly maintained while a base station is operated in the LDM for a terminal to be able to scan neighboring base stations without periodically receiving data of the base station operated in the LDM.

Technical Solution

A base station management method according to an exemplary embodiment of the present invention is a method for managing an operation mode of a base station, and includes determining whether a terminal exists in a cell managed by the base station, and operating in a low duty operation mode (LDM) when no terminal exists in the cell.

The LDM may include at least one available interval performing signal transmission and at least one unavailable interval not performing signal transmission.

The operating in the LDM mode may include transmitting a signal for performing at least one of paging, transmission of transmission system data, ranging, and transmission of data traffic.

The base station may include a femto base station managing a femtocell.

The operating in the LDM may include at least one of performing synchronization with a macro base station managing a macrocell where the base station is included during the unavailable interval and measuring interference from a neighboring base station.

The management method may further include setting a default LDM pattern for a pattern with which the base station is operated in the LDM.

The default LDM pattern may repeat the available interval and the unavailable interval.

When the base station enters the LDM, the default LDM pattern may be activated.

The management method may further include determining whether a terminal performing a network entry procedure exists in the cell, and operating the base station in the LDM when no terminal performing the network entry procedure exists.

A base station management device according to another exemplary embodiment of the present invention manages an operation mode of a base station, and includes a determination unit determining whether a terminal exists in a cell managed by the base station and a control unit controlling the base station to be operated in an LDM when no terminal exists in the cell.

The LDM may include at least one available interval performing signal transmission and at least one unavailable interval not performing signal transmission.

The management device may further an LDM pattern setting unit setting a default LDM pattern for a pattern with which the base station is operated in the LDM.

The default pattern may repeat the available interval and the unavailable interval.

When the base station enters the LDM, the default base station may be activated.

The management device may further include a transmission unit transmitting the default pattern to a neighboring base station for scanning of the terminal.

A terminal according to another exemplary embodiment of the present invention may include a receiving unit receiving a default LDM pattern for a pattern with which a base station is operated in the LDM, and a scanning unit scanning the base station operated in the LDM based on the default LDM pattern.

The default LDM pattern may include at least one available interval performing signal transmission and at least one unavailable interval not performing signal transmission.

The scanning unit may further perform cell scanning for performing network entry based on the default LDM pattern.

The base station may include a femto base station managing a femtocell.

Advantageous Effects

According to the present invention, while a base station is operated in an LDM, a terminal can scan neighbor base stations according to a predetermined LDM pattern without receiving data of the base station operated in the LDM so that signal overhead of a communication system can be decreased.

MODE FOR INVENTION

Figure 1:
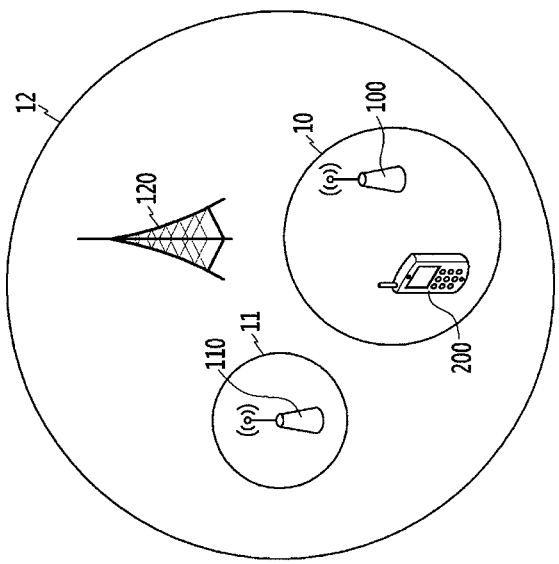
FIG. 1 schematically shows a mobile communication system according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and operation and can be implemented by hardware components or software components and combinations thereof.

In the specification, a terminal may designate a mobile station (MS), a mobile terminal (MT), a subscriber station (SS), a portable subscriber station (PSS), user equipment (UE), an access terminal (AT), etc., and may include the entire or partial functions of the terminal, the mobile terminal, the subscriber station, the portable subscriber substation, the user equipment, the access terminal, etc.

In the specification, the base station (BS) may designate an access point (AP), a radio access station (RAS), a nodeB, an evolved nodeB (eNodeB), a base transceiver station (BTS), a mobile multihop relay (MMR)-BS, etc., and may include the entire or partial functions of the access point, the wireless access station, the nodeB, the eNodeB, the base transceiver station, the MMR-BS, etc.

A management device of a base station, a management method of the base station, a terminal, and a management method of the terminal according to an exemplary embodiment of the present invention will now be described in detail with reference to the accompanying drawings.

FIG. 1 schematically shows a mobile communication system according to an exemplary embodiment of the present invention.

Referring to FIG. 1, the mobile communication system includes femto base stations 100 and 110, a macro base station 120, and a terminal 200.

The femto base stations 100 and 110 are miniaturized base stations that provide a wireless communication service to, for example, a region having a radius of 10 cm to 30 m, and for example, are installed in a shadow area in which radio waves of other cells are deteriorated, such as a home or the inside of a building, to secure the quality of a mobile communication service. The femto base stations 100 and 110 respectively manage femtocells 10 and 11. Herein, femto base stations 100 and 110 and femtocells 10 and 11 are terms that are not limited to a dictionary definition of femto, and include a miniaturized base station and a miniaturized cell range having a name of a unit that is larger or smaller than the femto base stations 100 and 110 and the femtocells 10 and 11.

The femto base stations 100 and 110 may use a public Internet network that is generally used on a wired Internet network as a backbone network.

The macro base station 120 manages a macrocell 12. The macrocell 12 includes the femtocells 10 and 11. The macrocell 12 is a cell in a region that is larger than the femtocells 10 and 11, and is not limited to a dictionary definition of macro.

The macro base station 120 and the femto base stations 100 and 110 are connected to each other through a wireless network. The macro base station 120 can manage the femto base stations 100 and 110 that are connected thereto.

The terminal 200 as an endpoint of a wireless channel accesses the femto base stations 100 and 110 and the macro base station 120 to transmit and receive data.

Hereinafter, the base station management device will be described in further detail with reference to FIG. 2, FIG. 3, and FIG. 4.

Figure 2:
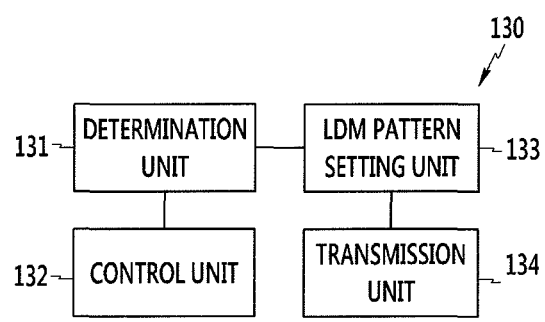
FIG. 2 is a schematic block diagram of a base station management device according to the exemplary embodiment of the present invention.
Figure 3:
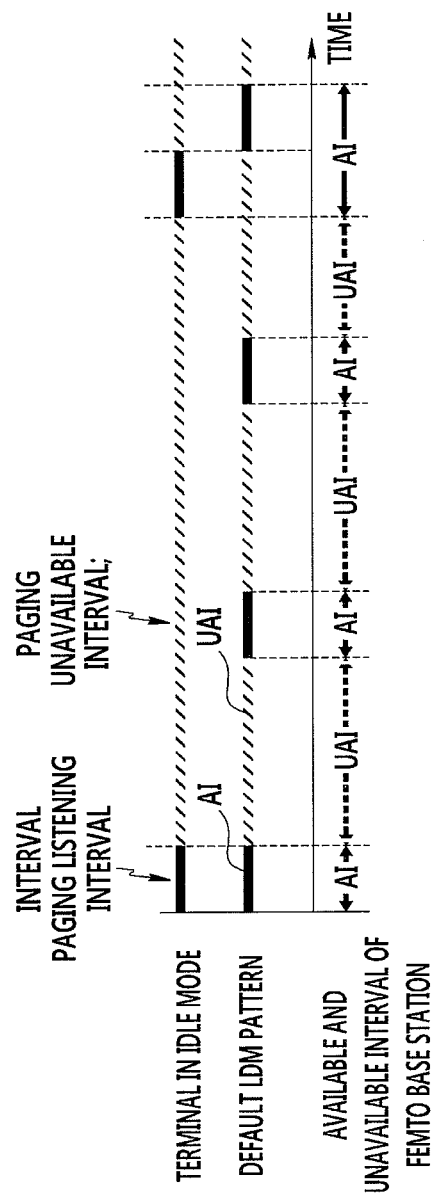
FIG. 3 shows an example of a low duty operation mode of a base station and a terminal according to the exemplary embodiment of the present invention.
Figure 4:
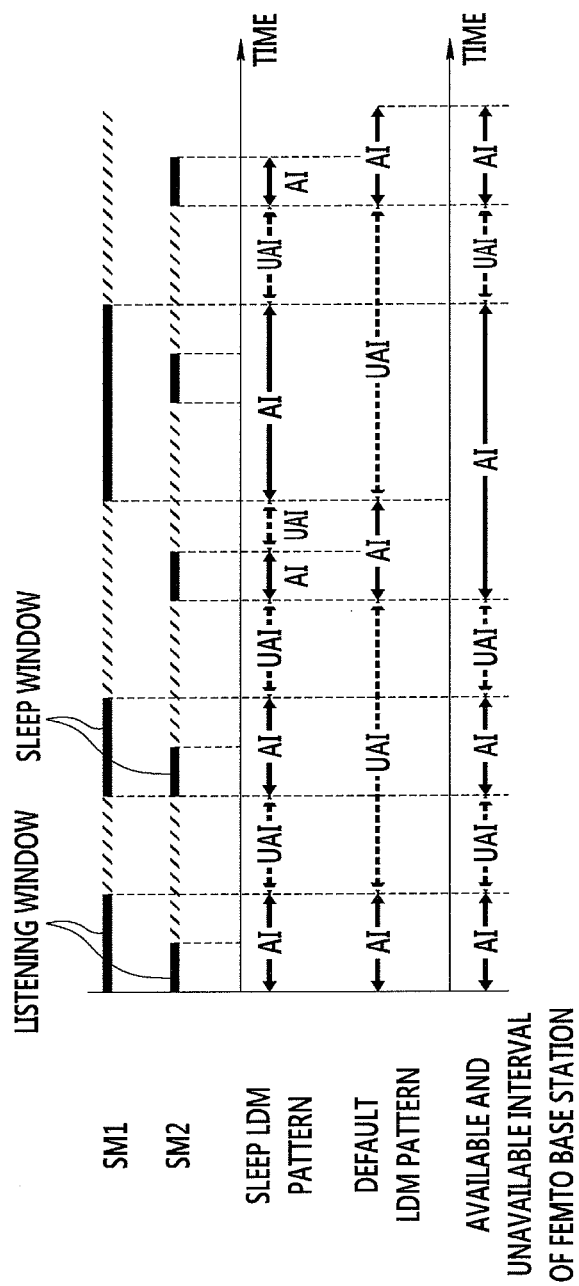
FIG. 4 shows another example of a low duty operation mode of a base station and a terminal according to the exemplary embodiment of the present invention.

FIG. 2 is a schematic block diagram of the base station management device according to the exemplary embodiment of the present invention, FIG. 3 shows an example of a base station and a terminal operated in a low duty operation mode (LDM) according to the exemplary embodiment of the present invention, and FIG. 4 shows another example of a base station and a terminal operated in an LDM according to the exemplary embodiment of the present invention.

Referring to FIG. 2, a base station management device 130 is included in the femto base stations 100 and 110 or the macro base station 120, and includes a determination unit 131, a control unit 132, an LDM pattern setting unit 133, and a transmission unit 134.

The determination unit 131 determines whether a terminal exists in the femtocell 10 managed by the femto base station 100. Further, the determination unit 131 determines whether a terminal performing a network entry procedure exists in the femtocell 10.

When no terminal exists in the femtocell 10 and no terminal performing the network entering process exists in the femtocell 10, the control unit 132 controls the femto base station 100 to be operated in the LDM.

When the femto base stations 100 and 110 are operated in the LDM, the LDM pattern setting unit 133 determines and sets an LDM pattern. When no terminal is being connected to the cells 10 and 12 managed by the femto base stations 100 and 110, when no terminal is performing the network entry procedure, and when a terminal 200 being connected to the cells 10 and 22 is in an idle mode or a sleep mode, the femto base stations 100 may be operated in the LDM.

The LDM pattern set by the LDM pattern setting unit 133 includes a default LDM pattern, an idle LDM pattern, and a sleep LDM pattern. The default LDM pattern sets a periodically available interval when the femto base stations 100 and 110 are operated in the LDM, and is data for a neighboring terminal 100 to scan the femto base stations 100 and 110 operated in the LDM. The idle LDM pattern and the sleep LDM pattern are determined according to the idle mode and the sleep mode of the terminal 200, and the two patterns are operable in the femto base stations 100 and 110.

The transmission unit 134 transmits the LDM pattern set by the LDM pattern setting unit 133 to neighboring base stations 110 and 120 or the terminal 200.

FIG. 3 illustrates an operation pattern of the terminal 200 in the idle mode (hereinafter, referred to as an idle mode pattern of a terminal). The idle mode pattern of the terminal includes a paging listening interval and a paging unavailable interval.

As a periodically fixed pattern as shown in FIG. 3, the default LDM pattern may be set in the femto base station 100 with consideration of interference performance with neighboring base stations 110 and 120 and scanning performance of the terminal 200, and includes an available interval (AI) and an unavailable interval (UAI).

The available interval AI of the default LDM pattern may be set to be long enough for the terminal 200 to perform paging, transmission of transmission system data, ranging, and transmission of data traffic while being synchronized with the femto base station 100, and may be equal to or longer than the paging listening interval of the idle mode pattern of the terminal.

The unavailable interval UAI of the default LDM pattern corresponds to a time period for the femto base station 100 to be synchronized with the macro base station 120 or a time period for measuring interference from the neighboring base stations 110 and 120, and may be longer than a time period consumed for the corresponding work. In addition, the unavailable interval UAI of the default LDM pattern may be set with consideration of the scanning performance of the terminal 200. Further, the unavailable interval UAI of the default LDM pattern may be set to be equal to or shorter than the paging unavailable interval of the idle mode pattern of the terminal.

Unlike as shown in FIG. 3, the default LDM pattern may be set to correspond to the idle mode pattern of the terminal 200. If a terminal group that matches at least one terminal group managed by a macro base station 120 among at least one terminal group managed by the femto base station 120 exists, the default LDM pattern may include the corresponding terminal group.

When the terminal 200 has the idle mode pattern like the one shown in FIG. 3 and the femto base station 100 has the default LDM pattern like the one shown in FIG. 3, an available interval AI and an unavailable interval UAI of the femto base station 100 are determined as shown in FIG. 3.

A plurality of femto base stations having the same idle mode pattern may have the same default LDM pattern, and the default LDM pattern may be set to correspond to the idle mode pattern.

A plurality of femto base stations allocated with the same frequency may have the same default LDM pattern, and a plurality of femto base stations 100 and 110 included in one macrocell 12 may have the same default LDM pattern. In this case, the default LDM pattern may not correspond to the idle mode pattern. Then, the LDM pattern setting unit 133 may set an idle LDM pattern. The idle LDM pattern may include a paging available interval and a paging unavailable interval of an idle mode pattern of a terminal, not included in the default LDM pattern.

Meanwhile, when a terminal 200 in the sleep mode exists in the femto base station 10 operated in the LDM, the LDM pattern setting unit 133 may set a sleep LDM pattern. This will be described in further detail with reference to FIG. 4.

FIG. 4 exemplarily illustrates sleep mode patterns SM1 and SM2 of each of two terminals respectively in sleep mode. The sleep mode patterns SM1 and SM2 of each terminal include a listening window and a sleep window. In this case, the sleep LDM pattern set by the LDM pattern setting unit 133 of the femto base station 100 can be determined as shown in FIG. 4 with consideration of the sleep mode patterns SM1 and SM2 of each terminal. The sleep LDM pattern includes an available interval AI and an unavailable interval UAI, the available interval AI of the sleep LDM pattern includes all of the listening windows of the sleep mode patterns SM1 and SM2, and the unavailable interval UAI of the sleep LDM pattern is set to be equivalent to all of the sleep windows of the sleep mode patterns SM1 and SM2.

In this case, the default LDM pattern of the femto base station 100 may also be set as shown in FIG. 4.

In this case, the available interval AI and the unavailable interval UAI of the femto base station 100 are determined as shown in FIG. 4.

A terminal according to another exemplary embodiment of the present invention will now be described in further detail with reference to FIG. 5.

Figure 5:
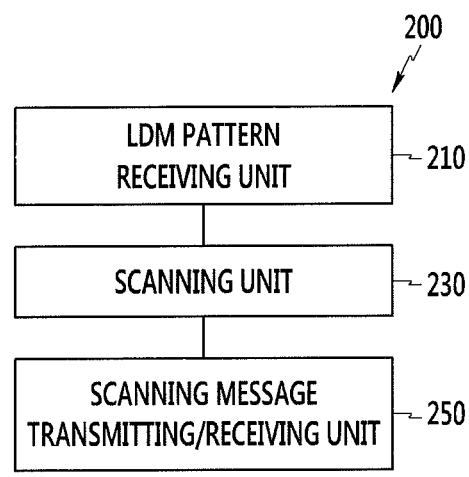
FIG. 5 is a schematic block diagram of a terminal according to an exemplary embodiment of the present invention.

FIG. 5 is a schematic block diagram of a terminal according to the other exemplary embodiment of the present invention.

Referring to FIG. 5, a terminal 200 includes an LDM pattern receiving unit 210, a scanning unit 230, and a scanning message transmitting/receiving unit 250.

The LDM pattern receiving unit 210 receives an LDM pattern set by a femto base station 100 from the femto base station 100 or neighboring base stations 110 and 120. Here, the femto base station 100 manages a femtocell 10 in which the terminal 200 is included.

The scanning unit 230 scans the femto base station 100 operated in LDM according to the LDM pattern received by the LDM pattern receiving unit 210.

The scanning message transmitting/receiving unit 250 transmits or receives messages associated with scanning to or from the femto base stations 100 and 110 or the macro base station 120. The scanning message transmitting/receiving unit 250 receives a scanning response message SCN-RSP including parameters for scanning from the femto base stations 100 and 110 or the macro base station 120. An available interval AI included in the default LDM pattern may be included in a scanning interval duration included in the scanning response message SCN-RSP. In this case, the LDM pattern receiving unit 210 does not need to receive an additional LDM pattern, and the scanning unit 230 scans a femto base station 100 operated in LDM by using the available interval AI data included in the default LDM pattern included in the scanning response message SCN-RSP.

Meanwhile, when the LDM pattern setting unit 133 of the femto base station 100 uses a fixed default LDM pattern, the terminal 200 stores the default LDM pattern and the scanning unit 230 can scan a femto base station 100 operated in LDM using the stored default LDM. In such a case, the LDM pattern receiving unit 210 does not receive an LDM pattern.

If the unavailable interval UAI included in the default LDM pattern set by the LDM pattern setting unit 133 of the femto base station 100 is too small and thus several available intervals AI exist within a scanning interval set by the macro base station 120, a terminal 200 in the macrocell 12 performs scanning within a scanning interval allocated thereto without default LDM pattern data to scan a femto base station 100 operated in LDM. In this case, the LDM pattern receiving unit 210 does not receive an LDM pattern.

Meanwhile, the scanning unit 230 can scan a femto base station 100 that has been operated in the LDM and its operation mode is changed to a normal mode from the LDM, and this will now be described in further detail. When the scanning message transmitting/receiving unit 250 of the terminal 200 transmits a scanning request message SCN_REQ to request scanning to a serving base station, that is, the femto base station 110 and the macro base station 120, the serving base stations 110 and 120 allocate a scanning interval and a recommended base station identification (BS ID) through a scanning response message SCN_RSP. When a terminal that desires to scan a femto base station 100 operated in LDM exists, the serving base stations 110 and 120 requests the femto base station 100 operated in LDM to change its operation mode from the LDM to a normal mode through a backbone network. The femto base station 100 that has received the request changes its operation mode from the LDM to the normal mode according to the scanning interval of the terminal and performs continuous downlink transmission during a predetermined time period. When the predetermined time period, that is, the scanning interval of the terminal is terminated, the femto base station 100 changes its operation mode back to the LDM. The terminal attempts scanning during the scanning period allocated by the serving base stations 110 and 120, and then reports a result of the attempt to the serving base stations 110 and 120 using a scanning report message SCN_REP.

Meanwhile, the scanning unit 230 performs cell scanning for a terminal 200 in the femtocell 10 of the femto base station 100 operated in LDM to perform initial network entry to the femtocell using the LDM pattern received by the receiving unit 210. That is, when the terminal 200 is powered off and then powered on, the terminal 200 in the femtocell 10 operated in LDM can select a femto base station 100 operated in LDM without selecting a macro base station 120. In further detail, the scanning unit 230 of the terminal 200 performs cell selection after performing the cell scanning during a time period that is longer than the unavailable interval UAI included in the LDM pattern. That is, in order for the terminal to perform the initial network entry to the femto base station 100 operated in LDM, the scanning should be performed according to the available interval AI of the default LDM, and therefore the scanning interval should be set to be longer than the sum of the available interval AI and the unavailable interval UAI of the default LDM.

Figure 6:
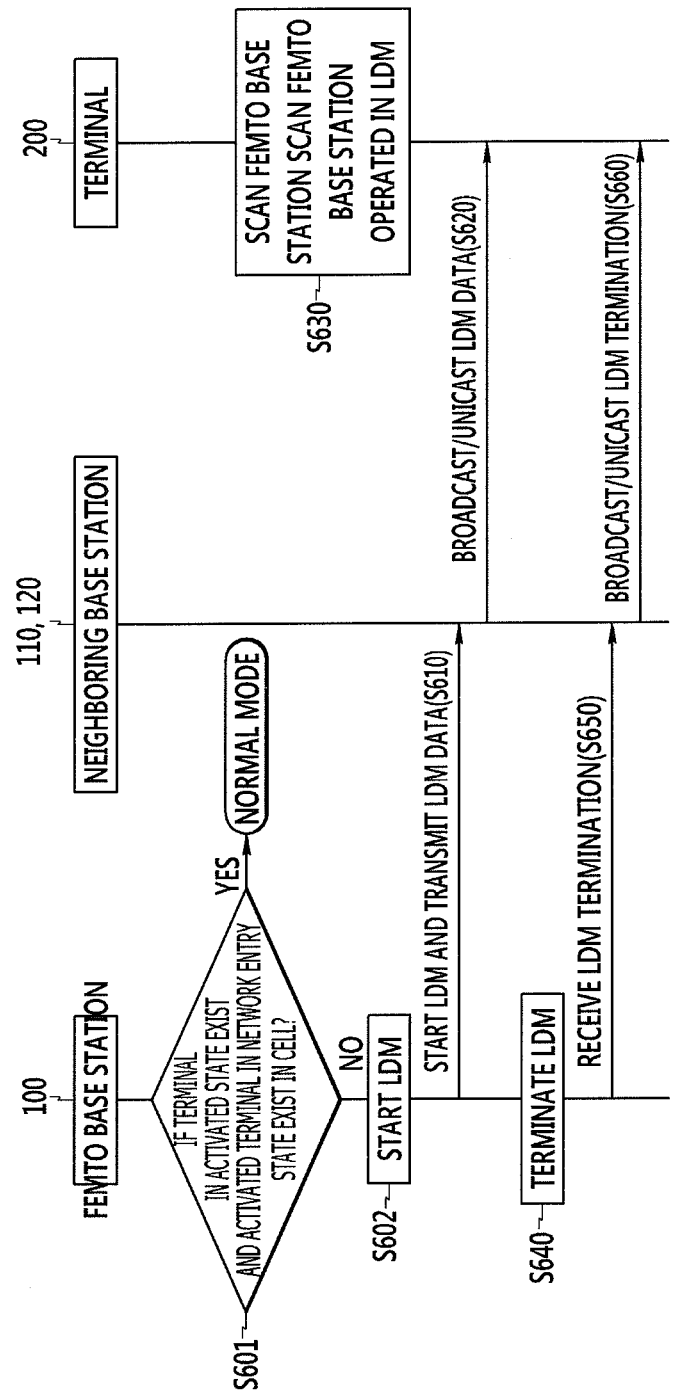
FIG. 6 is a flowchart of an operation method of the base station and the terminal according to an exemplary embodiment of the present invention.

Referring to FIG. 6, an LDM operation method of a base station and a terminal will be described in further detail.

FIG. 6 is a flowchart of an LDM operation method of a base station and a terminal according to another exemplary embodiment of the present invention.

First, it is determined whether a terminal in an active state exists and whether an activated terminal performing a network entry process exists in a femtocell 10 (S601).

If no terminal in the active state exists in the femtocell 10 and no activated terminal performing the network entry process exists in the femtocell 10, an LDM is started (S602).

Then, the femto base station 100 initializes the LDM and then transmits the start of LDM and LDM data to the neighboring base stations 110 and 120 (S610) through a backhaul. Here, the LDM data corresponds to the default pattern described with reference to FIG. 3 and FIG. 4.

When no terminal 200 exists in the femtocell 10, the femto base station 100 uses the default LDM pattern while being operated in LDM.

If all the terminals 200 in the femtocell 10 are in the sleep mode, the femto base station 100 is operated in the LDM, and uses the default LDM pattern and the sleep LDM pattern in an overlapped manner.

The following is a case that all the terminals 200 in the femtocell 10 are in the idle mode.

First, when the available interval AI included in the default LDM pattern includes paging listening intervals of all the terminals 200 managed by the femto base station 100, the femto base station 100 is operated in the LDM and uses the default LDM pattern.

When the available interval AI included in the default LDM pattern does not include the paging listening intervals of all the terminals 200 managed by the femto base station 100, the femto base station 100 is operated in the LDM and uses the default LDM pattern, the available interval AI of the default LDM pattern, and another idle LDM pattern in an overlapped manner.

Meanwhile, when a terminal in the idle mode and a terminal in the sleep mode both exist in the femtocell 10, the femto base station 100 is operated in the LDM and uses the default LDM pattern, the idle LDM pattern, and the sleep LDM pattern in an overlapped manner.

Subsequent to step S610, the neighboring base stations 110 and 120 broadcast or unicast the received LDM data to the terminal 200 (S620). However, when the terminal 200 receives data on the available interval AI of the default LDM pattern through the scanning response message SCN_RSP from the neighboring base stations 110 and 120 and when the terminal 200 is aware of the available interval AI of the default LDM pattern because the femto base station 100 uses the fixed default LDM pattern, the step S620 is omitted.

The terminal 200 scans a femto base station 100 operated in the LDM using the received LDM (S630).

If the terminal 200 exists in the femtocell 10 and is operated in the sleep mode, the femto base station 100 does not need to transmit the default LDM pattern or the sleep LDM pattern through the neighboring base stations 110 and 120 because the terminal 200 is aware of the sleep mode pattern such as a sleep window or a listening window of itself by being operated in the sleep mode.

In addition, when the terminal 200 is operated in the idle mode while existing in the femtocell 10, the terminal 200 is aware of the idle mode pattern and therefore the femto base station 100 does not need to transmit the default LDM pattern or the idle LDM pattern through the neighboring base stations 110 and 120.

If at least one of terminals 200 in the active state exists in the femtocell 10, the femto base station 100 terminates the LDM (S640).

When a terminal in the neighboring cells 11 and 12 request a handover to the femto base station 100 operated in the LDM, the neighboring base stations 110 and 120 request the femto base station 100 to change its operation mode to the normal mode through a backhaul. Upon the request to change to the normal mode from the neighboring base stations 110 and 120, the femto base station 100 terminates the LDM.

Further, when a terminal in an idle mode or a sleep mode requests a change to an active state in the femtocell 10 managed by the femto base station 100 operated in the LDM, the femto base station 100 terminates the LDM.

When a terminal in the femtocell 100 managed by the femto base station 100 performs a network entry or network re-entry procedure to the femtocell 10, the femto base station 100 terminates the LDM.

After the termination of the LDM, the femto base station 100 informs the termination of the LDM to the neighboring base stations 110 and 120 through a backhaul (S650).

The neighboring base stations 110 and 120 broadcast or unicast the termination of LDM to the terminal 200 (S660).

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A management method for managing an operation mode of a base station, comprising:
   setting a default low duty operation mode (LDM) pattern in which an available interval and an unavailable interval are repeated;
   determining whether there are no terminals attached to the base station and there are no terminals in the process of network entry; and
   operating in LDM when there are no terminals attached to the base station and there are no terminals in the process of network entry,
   wherein the operated LDM includes at least one available interval and at least one unavailable interval, and
   the at least one available interval of the operated LDM includes the available intervals of the default LDM and available intervals of terminals in idle mode.

2. The management method of claim 1, wherein signal transmission is performed in the at least one available interval and signal transmission is not performed in the at least one unavailable interval.

3. The management method of claim 1, wherein the operating in the LDM mode comprises transmitting a signal for performing at least one of paging, transmission system data transmission, ranging, and data traffic transmission, in the at least one available interval.

4. The management method of claim 1, wherein the base station comprises a femto base station managing a femtocell.

5. The management method of claim 1, wherein the operating in the LDM comprises at least one of performing synchronization with a macro base station managing a macrocell where the base station is included during the unavailable interval and measuring interference from a neighboring base station, in the at least one unavailable interval.

6. A management device managing an operation mode of a base station, comprising:
   a determination unit determining whether there are no terminals attached to the base station and there are no terminals in the process of network entry;
   a control unit controlling the base station to be operated in a low duty operation mode (LDM) when there are no terminals attached to the base station and there are no terminals in the process of network entry; and
   an LDM pattern setting unit setting a default LDM pattern in which an available interval and an unavailable interval are repeated,
   wherein the operated LDM includes at least one available interval and at least one unavailable interval, and
   the at least one available interval of the operated LDM includes the available intervals of the default LDM and available intervals of terminals in idle mode.

7. The management device of claim 6, wherein signal transmission is performed in at least one available interval and signal transmission is not performed in the at least one unavailable interval.

8. The management device of claim 6, further comprising a transmission unit transmitting information on the default LDM pattern to a neighboring base station for scanning of the terminal.

9. A terminal comprising:
   a receiving unit receiving information on a default low duty operation mode (LDM) pattern in which an available interval and an unavailable interval are repeated, and
   a scanning unit scanning the base station operated in the LDM based on the default LDM pattern,
   wherein the operated LDM includes at least one available interval and at least one unavailable interval, and
   the at least one available interval of the operated LDM includes the available intervals of the default LDM and available intervals of terminals in idle mode.

10. The terminal of claim 9, wherein the scanning unit further performs cell scanning for performing network entry based on the default LDM pattern.

11. The terminal of claim 9, wherein the base station comprises a femto base station managing a femtocell.

* * * * *